(12) United States Patent
Nellen et al.

(10) Patent No.: US 9,266,415 B1
(45) Date of Patent: Feb. 23, 2016

(54) ROOF ASSEMBLY FOR A VEHICLE (71) Applicant: Inalfa Roof Systems Group B.V., Venray (NL)

(72) Inventors: Marcel Johan Christiaan Nellen, Merselo (NL); Rainer Gerhard Jüngling, Düsseldorf (DE)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 14/450,202

(22) Filed: Aug. 1, 2014

(51) Int. Cl.
*B60J 7/047* (2006.01)
*B60J 7/02* (2006.01)
*B60J 7/043* (2006.01)

(52) U.S. Cl.
CPC ............... *B60J 7/024* (2013.01); *B60J 7/0435* (2013.01)

(58) Field of Classification Search
USPC .......................................... 296/216.01–224
See application file for complete search history.

(56) References Cited

U.S. PATENT DOCUMENTS

| | | | | |
|---|---|---|---|---|
| 3,873,150 | A | * 3/1975 | Marr et al. | 296/224 |
| 4,005,901 | A | * 2/1977 | Lutke et al. | 296/218 |
| 6,158,803 | A | 12/2000 | Reihl et al. | |
| 6,164,718 | A | * 12/2000 | Stallfort | 296/222 |
| 6,224,146 | B1 | 5/2001 | Willard | |
| 6,257,658 | B1 | * 7/2001 | Nabuurs et al. | 296/223 |
| 2002/0021031 | A1 | 2/2002 | Radmanic | |
| 2011/0285181 | A1 | 11/2011 | Manders | |

FOREIGN PATENT DOCUMENTS

| | | | |
|---|---|---|---|
| GB | 384356 | * | 12/1932 |
| WO | 2010/088951 | | 8/2010 |

OTHER PUBLICATIONS

Communication regarding European Search Report for corresponding EP application No. 15179038.3, dated Dec. 17, 2015.

* cited by examiner

*Primary Examiner* — Dennis H Pedder
(74) *Attorney, Agent, or Firm* — Steven M. Koehler; Westman, Champlin & Koehler, P.A.

(57) ABSTRACT

A roof assembly for a vehicle includes a stationary part to be attached to the vehicle roof and at least one closure element movably supported by said stationary part. The element is movable between a closed position closing a roof opening, and an open, rearward position above a roof area behind the roof opening. At least one front guide track extends at least along the roof opening, whereas a rear guide track is mounted at least substantially rearward of the opening. A guiding device engages said rear guide track upon rearward movement of the closure element. The guiding device includes a lever which supports the element at least in the open position, the lever being rotatable around a pivoting axis and being provided with a loading member to load the lever at a distance from the pivoting axis at least when the element is in its closed position.

17 Claims, 10 Drawing Sheets

ROOF ASSEMBLY FOR A VEHICLE

BACKGROUND

The discussion below is merely provided for general background information and is not intended to be used as an aid in determining the scope of the claimed subject matter.

Aspects of the invention relate to a roof assembly having an opening in its fixed roof, comprising a stationary part to be attached to the vehicle roof and at least one closure element which is movably supported by said stationary part and which can be adjusted by means of a driving unit, wherein said closure element is movable between a closed position for closing the roof opening, and an open, rearward position for being at least partially above the roof area behind the roof opening, in which the roof opening is at least partially released or opened, wherein said stationary part is fitted with at least one front longitudinal guide track extending at least along the roof opening, whereas a rear longitudinal guide track is mounted at least substantially rearward of the roof opening, the closure element being supported near its front side by a front support which is movably guided by said front longitudinal guide track, and which is supported rearwards thereof by a rear support including a lifting device for moving the closure element in a vertical direction to and fro the closed position and a guiding device for engagement in said rear longitudinal guide track upon rearward movement of the closure element, the guiding device including a lever which supports the closure element at least in the open position Roof assemblies are known from the prior art. In a prior art roof, the lifting device is active when the closure element is in its front position, and the guiding device is active when the closure element is in rearwardly slid positions.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background. It is one of the objects of the invention to improve the prior art roof assembly.

According to a first aspect, the lever of the guiding device is provided with a loading member to load the lever at a distance from the pivoting axis at least when the closure element is in its closed position. This loading member can have several functions. It may prevent the lever and any connected parts from rattling under rough conditions, such as when driving on bad roads. In case the loading member is configured to load the lever in upward direction, the loading member may support the lever to such an extent that the lever can take over the supportive function of the lifting device partly or completely at least in the closed position of the closure member. This may for example be advantageous if the lifting device cannot or does not have a supportive function in the closed position of the closure member due to a reduction of the building package in the vertical direction.

Alternatively or additionally, the loading member may be configured to load the lever in a lateral and/or a longitudinal direction, which will mainly be done to prevent rattling.

The loading member may be mounted on the stationary part and may engage the lever when the closure element arrives in its closed position, in particular when the closure member engages a seal around the roof opening. Additionally or alternatively, at least a part of the loading member may be provided on, for example being integrated in, the lever itself.

BRIEF DESCRIPTION OF THE DRAWINGS

Further details and advantages appear from the following description with reference to the drawings showing embodiments of the roof system by way of example.

DETAILED DESCRIPTION OF THE ILLUSTRATIVE EMBODIMENTS

Figure 1:
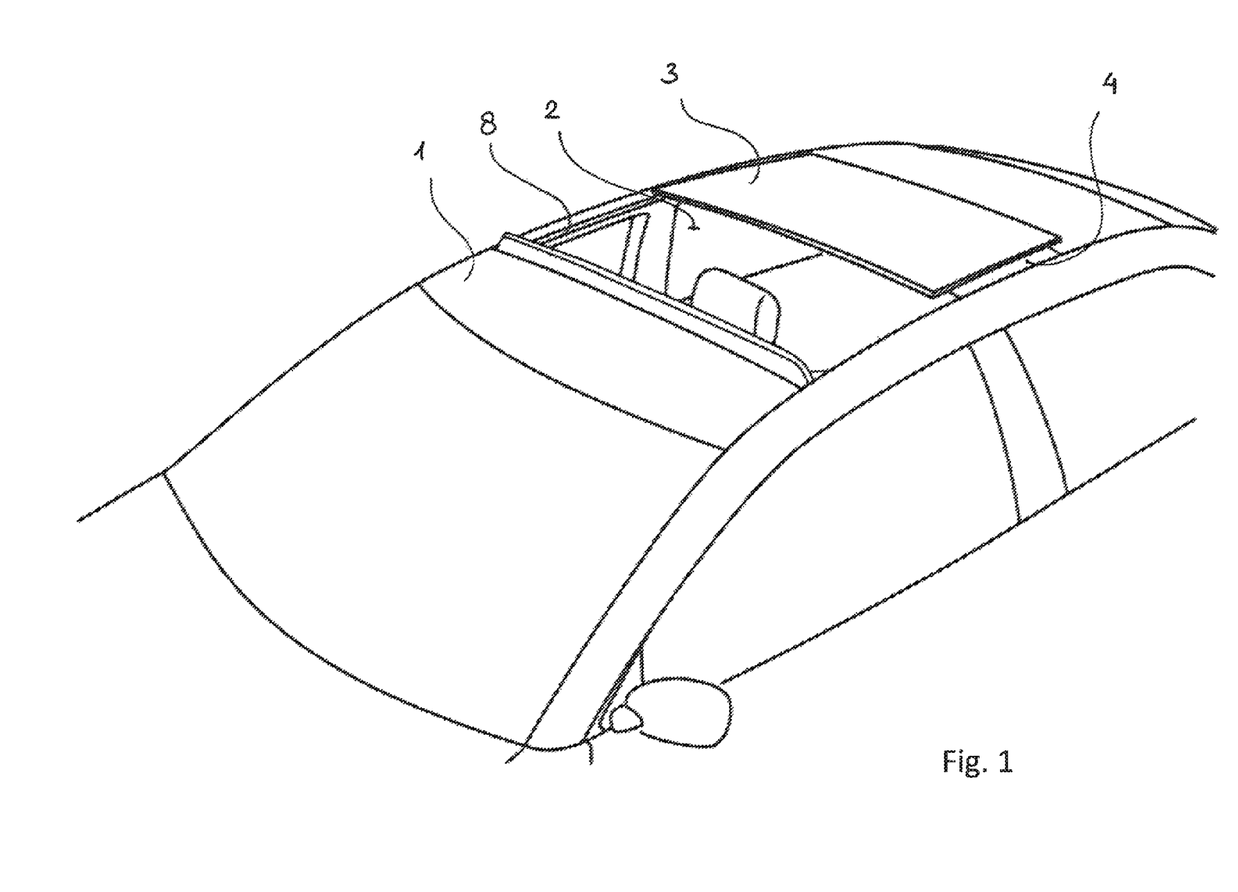
FIG. 1 is a schematic perspective view of a vehicle comprising a roof assembly.

The drawing, and in first instance FIG. 1, shows a vehicle, such as a passenger car or utility vehicle, comprising a fixed roof portion 1, in which a roof opening 2 has been formed for the purpose of accommodating a roof assembly. The fixed roof portion 1 may be part of the vehicle or part of the roof assembly and replacing the normal roof of the vehicle. In this embodiment the roof assembly comprises a first closure element 3 and a second closure element 4 which may both be in the form of a rigid panel, which may or may not be transparent, and which together close the roof opening 2 in their closed position and which can be opened from said closed position. The first closure element or panel 3 can in any case be opened by moving the rear side of the panel 3 upwardly and sliding the panel 3 rearwardly over the second panel 4. The second closure element 4 may also be comprised of a foldable cover, slats or the like, or may be a fixed panel, or just form part of the fixed roof portion 1 of the vehicle. It should be noted further reference to closure element or panel 4 herein should not be considered limiting, but rather one exemplary embodiment of a roof area behind panel 3.

Figure 2A:
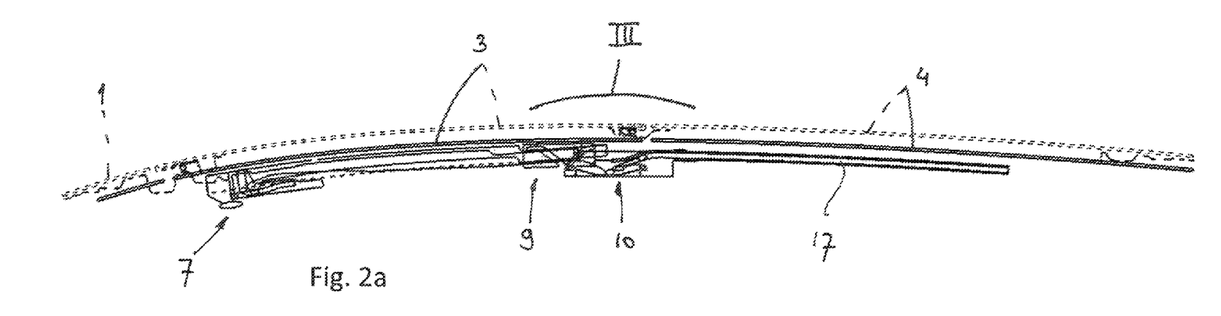
FIG. 2*a-c* are longitudinal sectional views of the roof assembly of FIG. 1 in three different positions.
Figure 2B:
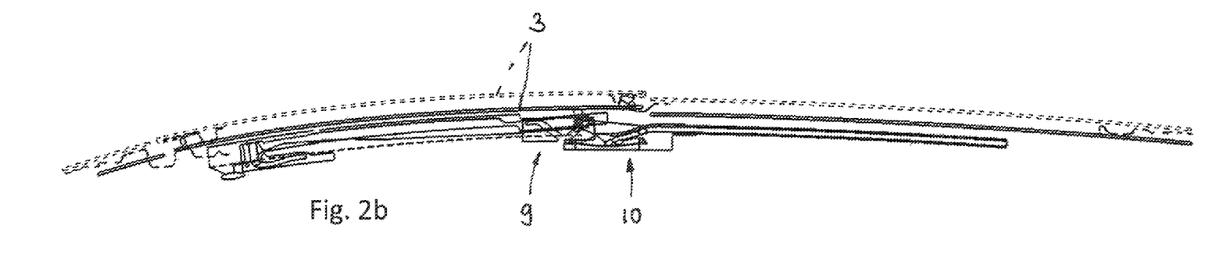
Figure 2C:
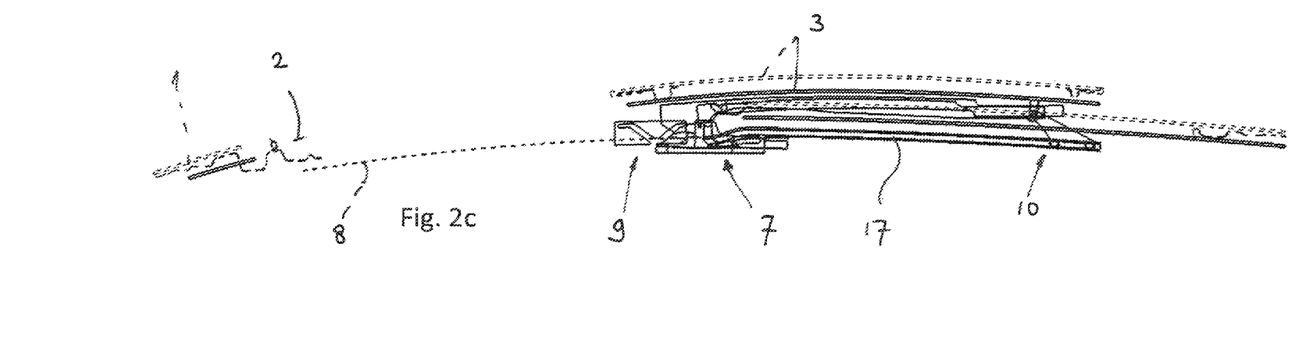

The operating mechanism for the first closing element 3 is shown in more or less detail in the other figures. FIG. 2*a-c* shows fixed roof portion 1 and first and second closure elements 3, 4 both in solid lines at the position of the operating mechanism and in interrupted lines at a section in the center line of the closure element 3, 4. A bracket 5 supporting closure element 3 is shown only partly and schematically. First closure element 3 is supported on its front side by a front support 7 which is slidable in a front guide track (indicated schematically by an interrupted line 8) which is part of or supported by a stationary part, such as a frame 6. This front support 7 is not part of the present invention and is not further shown and described in detail.

Closure element 3 is supported on its rear side by a lifting device 9 and a guiding device 10, normally through bracket 5.

The lifting device 9 is configured to support closure element 3 when it is moved in a vertical direction, i.e. around the closed position thereof.

Figure 3:
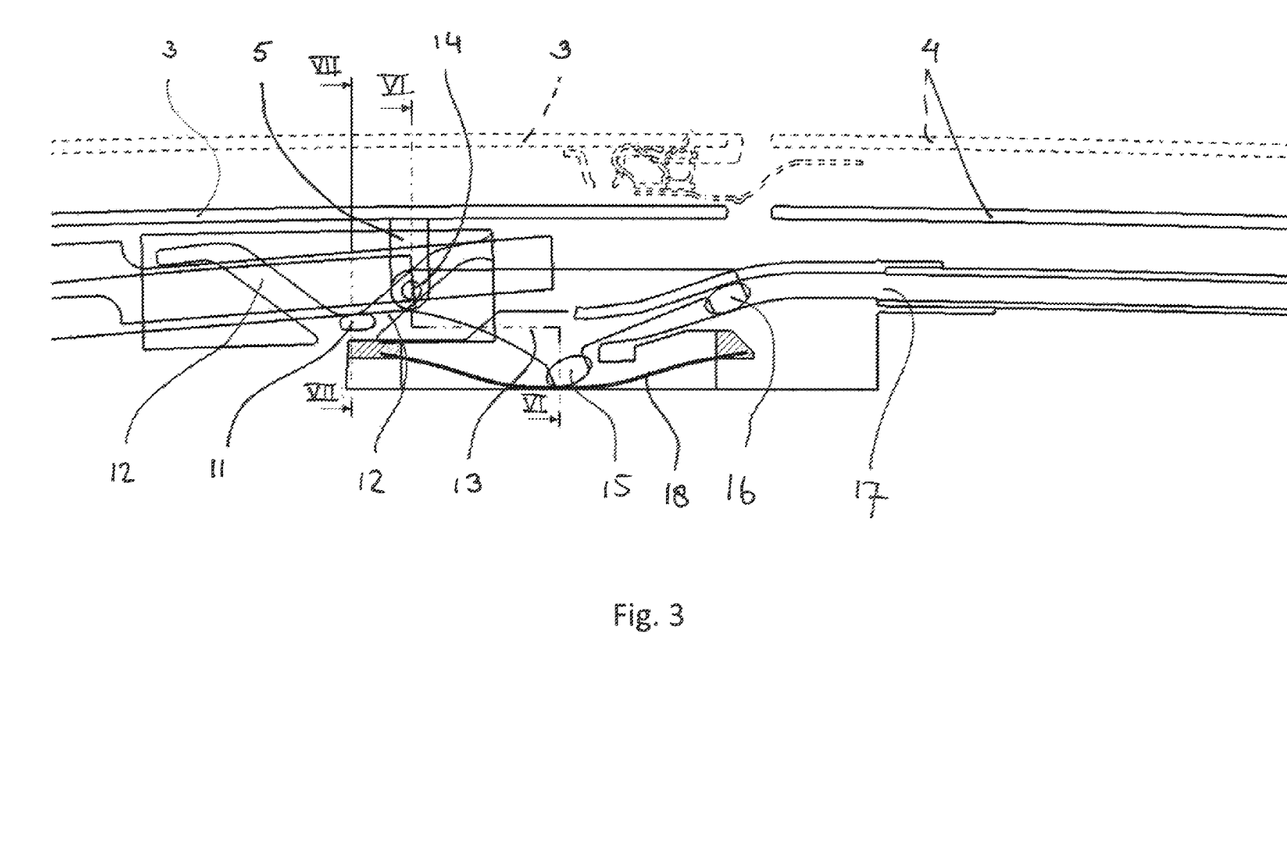
FIG. 3 shows detail III in FIG. 2*a* on a larger scale.
Figure 4:
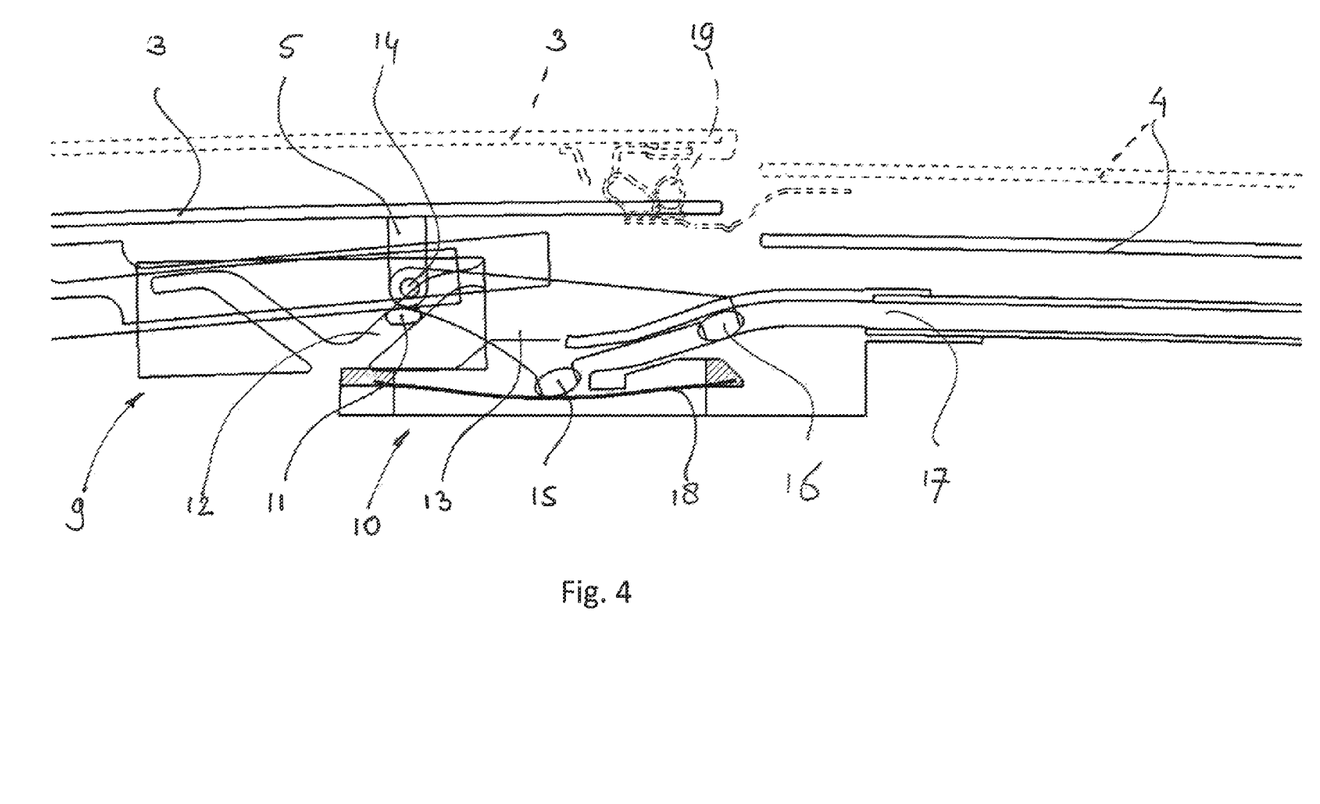
FIGS. 4 and 5 are views corresponding to that of FIG. 3 but showing the closure element in different positions.

FIGS. 3 and 4 show lifting device 9 and guiding device 10 in more detail. The lifting device 9 includes a forcing mechanism including a height adjustable part and a forcing guide. In the embodiment shown, there is a guide member or cam 11 which is slidably attached to closure element 3 and engages into a guide curve 12 when closure element 3 is in or near the closed position. The movement of cam 11 in guide curve 12 causes vertical displacements of cam 11 and therefore of the rear edge of closure element 3. In this case, V-shaped curve 12 has a left or front leg in which the cam 11 engages when closure element 3 is moved between its closed position and its venting position, in which closure element 3 is in its front position, but with its rear edge lifted. The right or rear leg of V-shaped curve 12 is used to move closure element 3 with its rear edge upwardly in order to be moved rearwardly above the fixed roof portion behind roof opening 2, here above rear closure element 4. The right leg of the V-shaped curve is open at its rear upper end, so that cam 11 may leave curve 12 as soon as the guiding device 10 has taken over the support function.

For this purpose, guiding device 10 comprises a lever 13 pivotally connected at its front upper end to bracket 5 by a pivot axis 14. Lever 13 comprises a front and rear slide shoe 15, 16, the two slide shoes 15, 16 and the pivot axis 14 forming a triangle. Rear slide shoe 16 is always in engagement with a rear longitudinal guide track 17 which, in this case, is positioned for the greater part behind roof opening 2 and also below the rear closure element 4, so that rear guide track 17 is not visible, only a passage for lever 13 alongside rear closure element 4. The major portion of guide track 17 extends parallel to the overlying rear closure element 4, only a front portion of rear guide track 17 extends forwardly and downwardly, such that the rear edge of closure element 3 starts to move downwardly towards the closed position when front slide shoe 15 enters this front portion.

Front slide shoe 15 is not always in engagement with rear guide track 17, but exits the front end of rear guide track 17 when the support function of guiding device 10 is taken over by lifting device 9. As soon as front slide shoe 15 has left rear guide track 17, lever 13 can freely rotate around rear slide shoe 16 (thus acting as a pivoting axis) and follow movements of the closure element 3 which are caused by lifting device 9.

Figure 5:
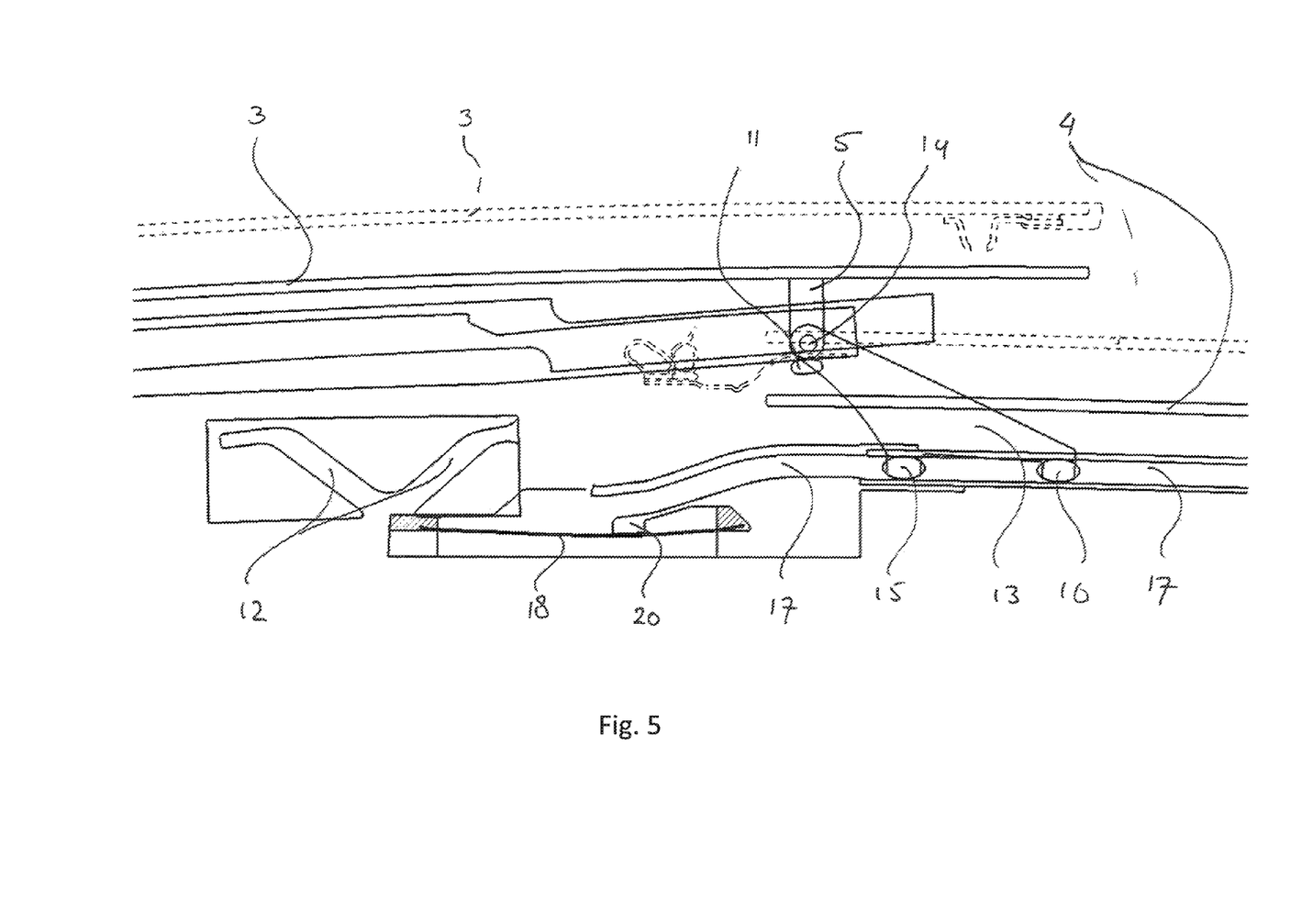

FIGS. 3-5 show that the stationary part of the roof system is provided with a loading member 18 for guiding device 10 arranged near the front end of rear guide track 17. Here, it is in the form of a leaf spring 18 configured to engage front slide shoe 15 of lever 13 when the front slide shoe 15 has left rear guide track 17 and closure element 3 has moved downwardly to such extent that the panel (e.g. glass) of closure element 3 touches a seal 19 that is provided around roof opening 2. FIG. 4 shows this situation. Front slide shoe 15 has just come into engagement with leaf spring 18 when the panel of closure element 3 arrives at and engages seal 19. Cam 11 is then approximately halfway along the right leg of V-shaped curve 12, so that cam 11 will travel downwards to its final position in which closure element 3 is closing roof opening 2. Front slide shoe 15 will travel downward a part of this downward distance (depending on its position on lever 13), and will thus deform leaf spring 18, so that leaf spring 18 will exert an increasing upward force on front slide shoe 15 and thereby on lever 13, in a position at a distance to rear slide shoe 16.

FIG. 3 shows that in the closed position of closure element 3, cam 11 has arrived at the bottom of the V-shaped curve 12, where curve 12 is open on the bottom side in order to keep the height of the curve part as small as possible to save building height. Due to the upward force of leaf spring 18, closure element 3 is still supported in its closed position, not by the lifting device 9 but by the lever 13 of guiding device 10 which is active in the closed position.

FIG. 5 shows the position of closure element 3 in which it is moved upwardly and rearwardly with respect to the closed position and in which closure element 3 is supported by lever 13 of guiding device 10 which is in engagement with rear guide track 17 with both of its slide shoes 15, 16, so that the position of lever 13 and thus of closure element 3 is fully determined by rear guide track 17 and the position of lever 13 therein. Leaf spring 18 is moved upwardly up to a stop 20 preventing a further upward movement of leaf spring 18. In one embodiment, at least one end of leaf spring 18 will be slidable (the other will generally be fixed) to allow the deformation of leaf spring 18.

Figure 6:
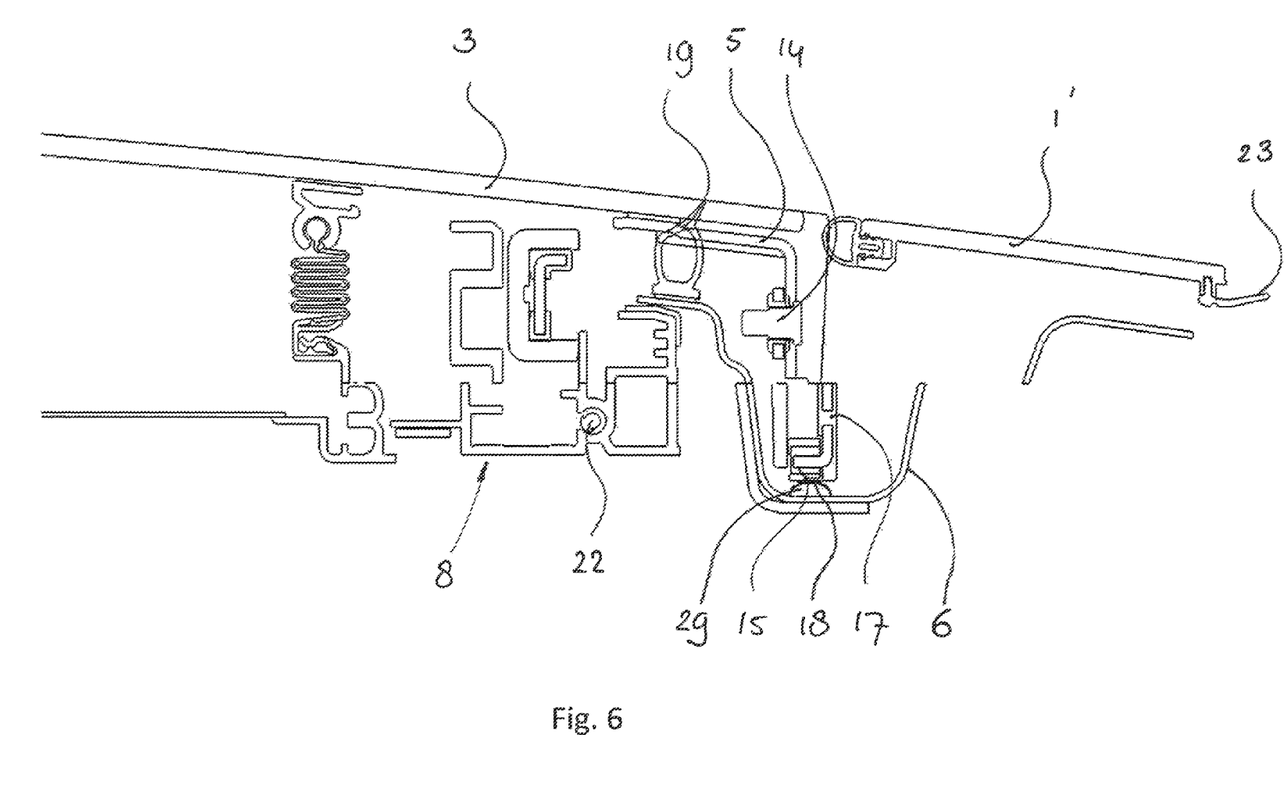
FIGS. 6 and 7 are sectional views according to the lines VI-VI and VII-VII, respectively, in FIG. 3.
Figure 7:
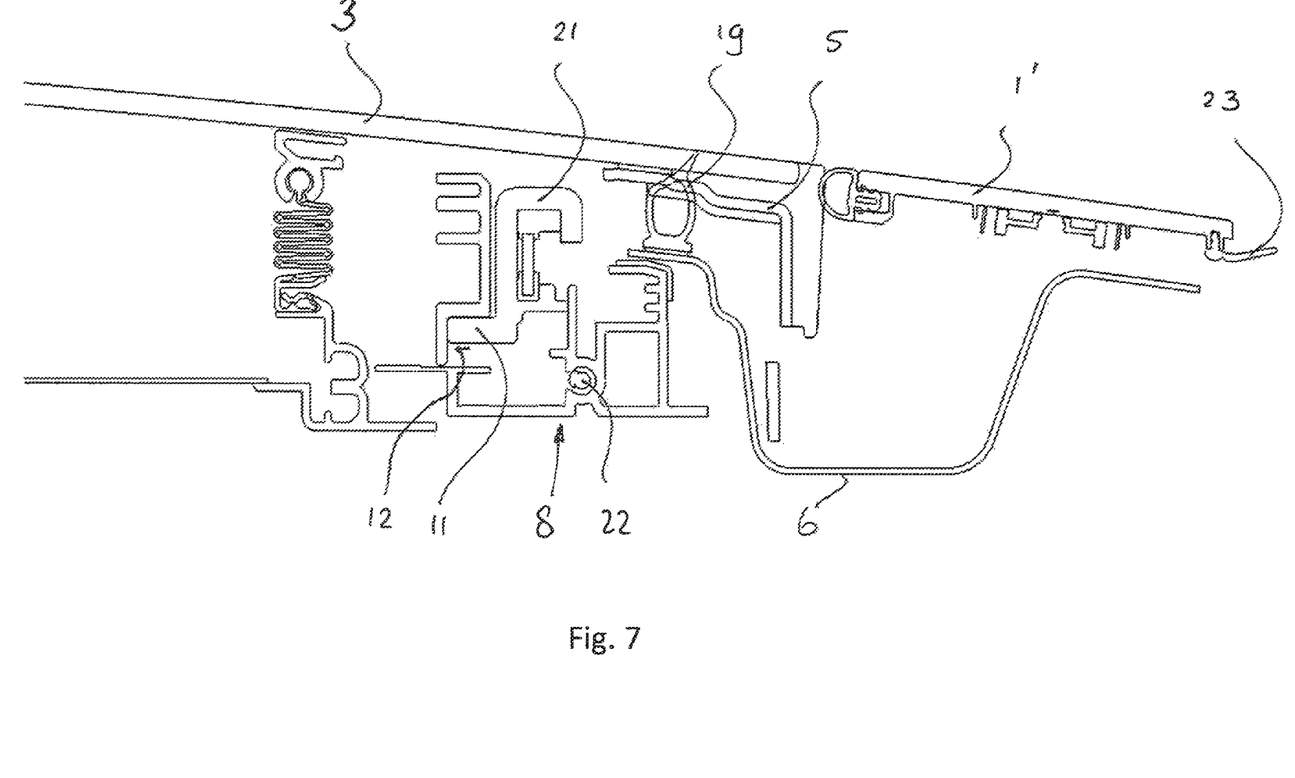

FIGS. 6 and 7 show in cross sections that the stationary part of the roof system has a wet part (outside seal 19, i.e. to the right in FIG. 6) and a dry part (inside seal 19, i.e. to the left in FIG. 6). Guiding device 10 is positioned laterally outwardly of lifting device 9 in the wet part, so that also leaf spring 18 is positioned in the wet part. FIG. 6 also shows (as well as FIG. 3) that leaf spring 18 may get support from a stop 29 in order to strengthen support of lever 13 at least in the closed position of closure element 3. The stop 29 may be rigid or more or less flexible. The stop 29 may also replace spring 18. Other configurations are conceivable.

FIG. 7 shows cam 11 in curve 12. Cam 11 is attached to a guide member 21 which is slidable with respect to closure element 3. A drive cable 22 (driven manually or by an electric motor) is guided in front guide track 8 and is configured to either drive guide member 21 with respect to closure element 3 (to make tilting movements) or closure element 3 with respect to front guide track 8 (to make sliding movements). The fixed roof portion 1' is part of the roof system and is provided with a seal 23 to seal against the fixed roof of the vehicle.

Figure 8:
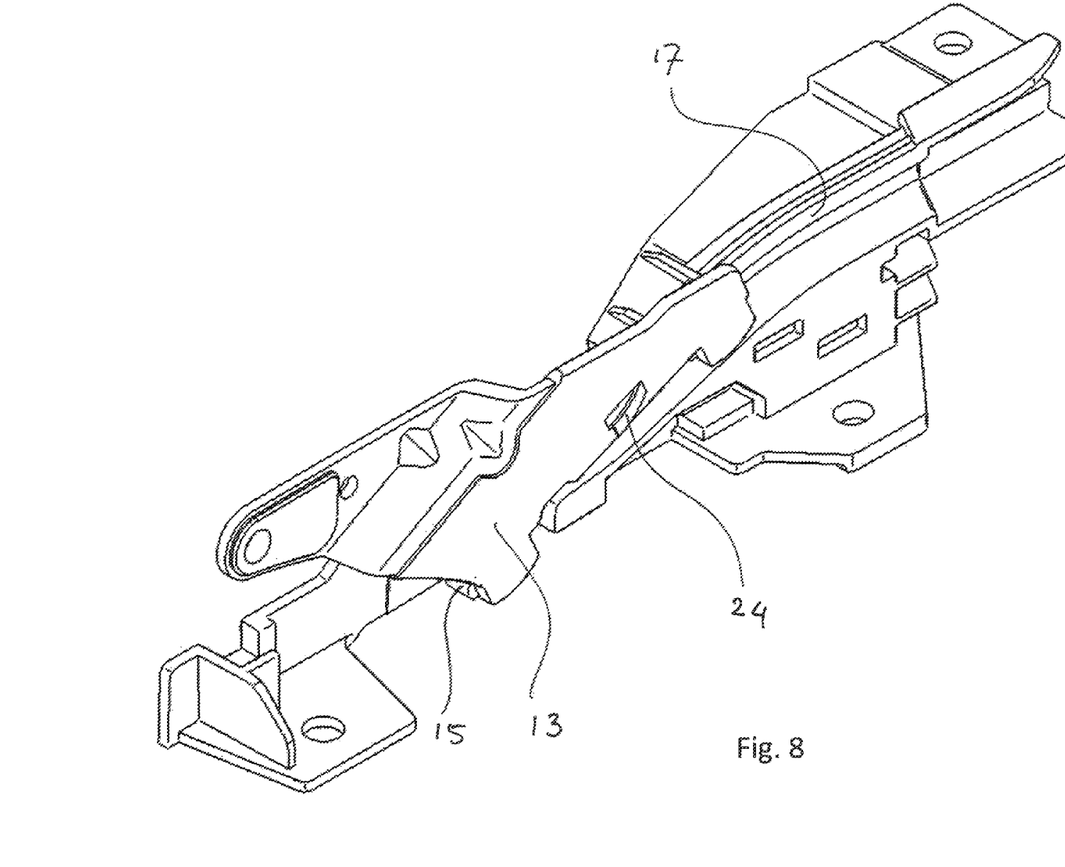
FIG. 8 is a perspective view of a mounted lever of another embodiment of the Roof assembly with a counter member for the loading member removed.
Figures 9, 10:
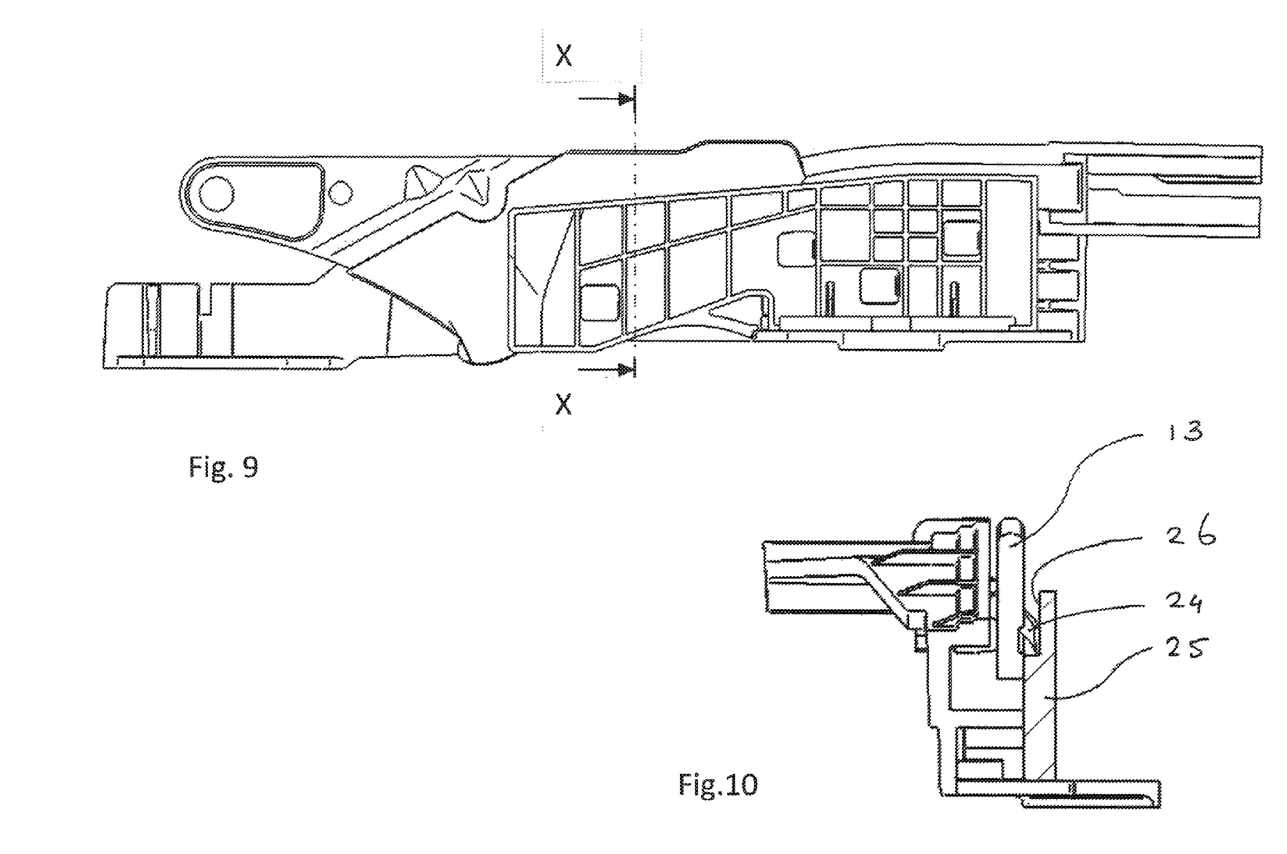
FIG. 9 is a side view of the mounted lever of FIG. 8 with counter member.
FIG. 10 is a sectional view along the line X-X in FIG. 9.

FIG. 8 shows a lever 13 of another embodiment of the roof system, which is also shown in FIGS. 9 and 10. In this embodiment, lever 13 itself is provided with a loading member, here in the form of an integral leaf spring 24 protruding from the side of lever 13 and being configured to engage a counterpart 25 (shown in FIGS. 9 and 10) when lever 13 approaches its position in which closure element 3 closes roof opening 2. The counterpart 25 may have the form of a wall with a recess 26 on its upper side to accommodate leaf spring 24, but such that leaf spring 24 engages the wall of recess 26, so that leaf spring 24 is loaded and the spring exerts a lateral pressure on lever 13. As a result, lever 13 is loaded to counteract any tendency of lever 13 to rattle in the closed position of closure element 3.

Figure 11:
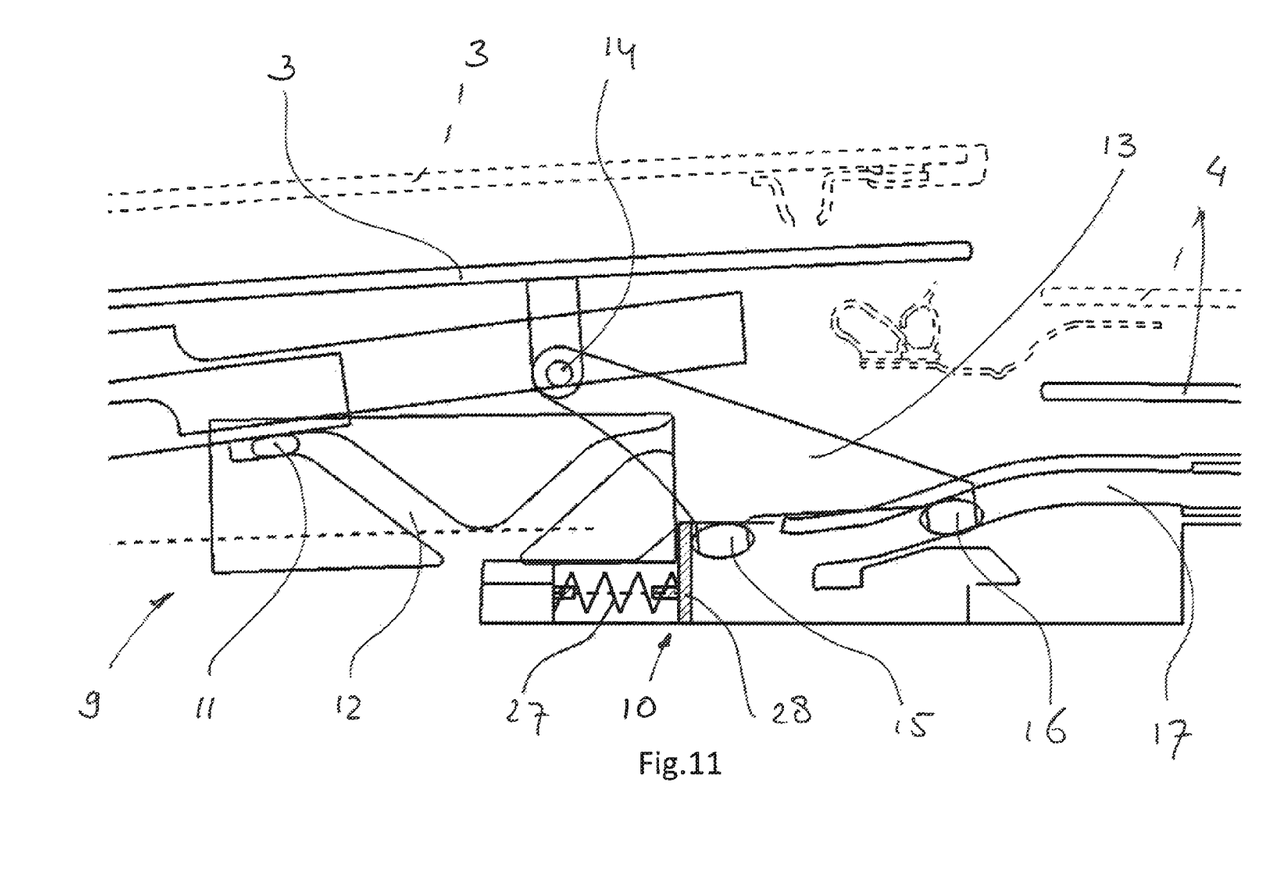
FIG. 11 is a view corresponding to that of FIG. 3 but showing the closure element in the venting position and showing a further embodiment of the roof assembly.

FIG. 11 shows another embodiment of the roof system in a very schematic way. There is shown a spring 27 as loading member. This spring 27 is shown as a compression spring having its axis in longitudinal direction of the roof system. An engaging wall 28 at the end of spring 27 is configured to come into engagement with front slide shoe 15 of lever 13 when front slide shoe 15 has exited rear guide track 17 to load lever 13 in the front positions of closure element 3, in this case in longitudinal direction of the roof system.

The invention is not limited to the embodiments shown and described above which may be varied in different manners within the scope of the appended claims. Features of different embodiments may be combined. Furthermore, it is noted that the term loading member also includes a member that mainly supports the guiding device, in particular in upward direction.

This supporting or holding function will generally cause contact between the loading member and the guiding device, which not only provides support, but which will also prevent rattling. The disclosed embodiments of the loading member are passive, i.e. the guiding device will come into engagement with the loading or counter member which is passive. It is however conceivable that the loading member is active and is for example controlled by the drive unit of the roof assembly in order to come into engagement with the guiding device by a movement of the loading member.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A roof assembly for a vehicle having an opening in its fixed roof, comprising:
    a stationary part configured to be attached to the vehicle roof, wherein said stationary part is fitted with at least one front longitudinal guide track extending at least along the roof opening, and a rear longitudinal guide track mounted at least substantially rearward of the roof opening; and
    at least one closure element which is movably supported by said stationary part, wherein said closure element is movable between a closed position for closing the roof opening, and an open, rearward position for being at least partially above a roof area behind the roof opening, in which the roof opening is at least partially released, the closure element being supported near its front side by a front support which is movably guided by said front longitudinal guide track, and which is supported rearwards thereof by a rear support including a lifting device configured to move the closure element in a vertical direction to and fro the closed position and a guiding device configured to engage in said rear longitudinal guide track upon rearward movement of the closure element, the guiding device including a lever which supports the closure element at least in the open position, the lever being rotatable around a pivoting axis and being provided with a loading member to load the lever at a distance from the pivoting axis at least when the closure element is in its closed position;
    wherein the loading member loads the lever in at least one of lateral and longitudinal directions; and
    wherein the lever is provided with two sliding shoes, which are in engagement with the rear longitudinal guide track when the lever acts as the guiding device, one of the sliding shoes being out of engagement with the rear longitudinal guide track when the loading member loads the lever.

2. The roof assembly of claim 1, wherein the loading member is provided at least partly on the lever.

3. The roof assembly of claim 2, wherein the lever is provided with a spring part protruding laterally and configured to engage a stationary counterpart at least in the closed position of the closure element.

4. A roof assembly for a vehicle having an opening in its fixed roof, comprising:
    a stationary part to configured to be attached to the vehicle roof, wherein said stationary part is fitted with at least one front longitudinal guide track extending at least along the roof opening, and a rear longitudinal guide track mounted at least substantially rearward of the roof opening; and
    at least one closure element which is movably supported by said stationary part, wherein said closure element is movable between a closed position for closing the roof opening, and an open, rearward position for being at least partially above a roof area behind the roof opening, in which the roof opening is at least partially released, the closure element being supported near its front side by a front support which is movably guided by said front longitudinal guide track, and which is supported rearwards thereof by a rear support including a lifting device configured to move the closure element in a vertical direction to and fro the closed position and a guiding device configured to engage in said rear longitudinal guide track upon rearward movement of the closure element, the guiding device including a lever which supports the closure element at least in the open position, the lever being rotatable around a pivoting axis and being provided with a loading member to load the lever at a distance from the pivoting axis at least when the closure element is in its closed position;
    wherein the loading member is configured to load the lever in an upward direction; and
    wherein the lifting device includes a forcing mechanism having a guide curve configured to be engaged by a guide member connected to the movable element, said guide member being unsupported when the closure element is in the closed position.

5. The roof assembly of claim 4, wherein the loading member is provided at least partly on the lever.

6. The roof assembly of claim 4, wherein the lever is connected to a bracket of the closure element through a pivoting axis.

7. A roof assembly for a vehicle having an opening in its fixed roof, comprising:
    a stationary part to configured to be attached to the vehicle roof, wherein said stationary part is fitted with at least one front longitudinal guide track extending at least along the roof opening, and a rear longitudinal guide track mounted at least substantially rearward of the roof opening; and
    at least one closure element which is movably supported by said stationary part, wherein said closure element is movable between a closed position for closing the roof opening, and an open, rearward position for being at least partially above a roof area behind the roof opening, in which the roof opening is at least partially released, the closure element being supported near its front side by a front support which is movably guided by said front longitudinal guide track, and which is supported rearwards thereof by a rear support including a lifting device configured to move the closure element in a vertical direction to and fro the closed position and a guiding device configured to engage in said rear longitudinal guide track upon rearward movement of the closure element, the guiding device including a lever which supports the closure element at least in the open position, the lever being rotatable around a pivoting axis and being provided with a loading member to load the lever at a distance from the pivoting axis at least when the closure element is in its closed position;
    wherein the loading member is configured to load the lever in an upward direction; and
    wherein the lever is provided with two sliding shoes, which are in engagement with the rear longitudinal guide track when the lever acts as the guiding device, one of the sliding shoes being out of engagement with the rear longitudinal guide track when the loading member loads the lever.

8. The roof assembly of claim 7, wherein the loading member is mounted on the stationary part and is configured to engage the lever when the closure element arrives in the closed position.

9. The roof assembly of claim 8, wherein the loading member is configured to engage the lever at the time when the closure element engages a seal around the roof opening.

10. The roof assembly of claim 9, wherein the loading member is a leaf spring member.

11. The roof assembly of claim 8, wherein the loading member is mounted near a front of the rear guide track.

12. The roof assembly of claim 7, wherein the lever is connected to a bracket of the closure element through a pivoting axis.

13. The roof assembly of claim 7, wherein the loading member includes a stop configured to prevent further movement of the loading member in an upward position.

14. The roof assembly of claim 7, wherein the lifting device includes a forcing mechanism having a guide curve configured to be engaged by a guide member connected to the movable element, said guide member being unsupported when the closure element is in the closed position.

15. A roof assembly for a vehicle having an opening in its fixed roof, comprising:
  a stationary part configured to be attached to the vehicle roof, wherein said stationary part is fitted with at least one front longitudinal guide track extending at least along the roof opening, and a rear longitudinal guide track mounted at least substantially rearward of the roof opening; and
  at least one closure element which is movably supported by said stationary part, wherein said closure element is movable between a closed position for closing the roof opening, and an open, rearward position for being at least partially above a roof area behind the roof opening, in which the roof opening is at least partially released, the closure element being supported near its front side by a front support which is movably guided by said front longitudinal guide track, and which is supported rearwards thereof by a rear support including a lifting device configured to move the closure element in a vertical direction to and fro the closed position and a guiding device configured to engage in said rear longitudinal guide track upon rearward movement of the closure element, the guiding device including a lever which supports the closure element at least in the open position, the lever being rotatable around a pivoting axis and being provided with a loading member to load the lever at a distance from the pivoting axis at least when the closure element is in its closed position;
  wherein the loading member loads the lever in at least one of lateral and longitudinal directions; and
  wherein the lifting device includes a forcing mechanism having a guide curve configured to be engaged by a guide member connected to the movable element, said guide member being unsupported when the closure element is in the closed position.

16. The roof assembly of claim 15, wherein the loading member is provided at least partly on the lever.

17. The roof assembly of claim 16, wherein the lever is provided with a spring part protruding laterally and configured to engage a stationary counterpart at least in the closed position of the closure element.

* * * * *